United States Patent [19]

Tysver et al.

[11] Patent Number: 5,052,537
[45] Date of Patent: * Oct. 1, 1991

[54] ROTARY TRAVEL LIMIT STOP APPARATUS

[75] Inventors: John D. Tysver; Gerald H. Johnson, both of Rockford, Ill.

[73] Assignee: Sundstrand Corporation, Rockford, Ill.

[ * ] Notice: The portion of the term of this patent subsequent to Jun. 5, 2007 has been disclaimed.

[21] Appl. No.: 450,668

[22] Filed: Dec. 14, 1989

[51] Int. Cl.$^5$ .............................................. F16D 71/00
[52] U.S. Cl. ................................ 192/141; 192/110 R; 188/134
[58] Field of Search .................... 192/141, 139, 110 R, 192/7; 74/10.2; 188/134

[56] References Cited

U.S. PATENT DOCUMENTS

| | | | |
|---|---|---|---|
| 4,641,737 | 2/1987 | Gillingham et al. | 192/141 |
| 4,721,196 | 1/1988 | Layer et al. | 192/141 |
| 4,877,120 | 10/1989 | Tysver et al. | 192/139 |

FOREIGN PATENT DOCUMENTS

1157306  5/1958  France .................. 192/139

Primary Examiner—Allan D. Herrmann
Assistant Examiner—Andrea Pitts
Attorney, Agent, or Firm—Antonelli, Terry, Stout & Kraus

[57] ABSTRACT

A rotary travel limit stop apparatus having a first rotary member (10) and second and third independently rotatable members (14 and 20) having slightly different numbers of gear teeth which engage the gear teeth on a first member (10) carry a movable stop pin (30) which is adapted to engage a fixed stop member (40) only during a revolution near the limit stop position of a controlled element such as an aileron. A stop plate (54) carrying a fixed stop member (40) is angularly adjusted by rotation of a screw (70) which is received by a barrel nut (64) that is coupled to the stop plate (54) by a protuberance (66).

14 Claims, 6 Drawing Sheets

ROTARY TRAVEL LIMIT STOP APPARATUS

TECHNICAL FIELD

This invention relates to rotary travel limit stop mechanisms and more particularly to a mechanism having a moving stop member on a rotating member which is selectively extended as a limit position of the controlled element is approached to engage a fixed stop member that is adjustably positioned along the circumferential path of the moving stop member to provide infinitesimal adjustment.

BACKGROUND ART

Many devices are known for purposes of stopping machinery after machinery experiences a predetermined number of revolutions of its components or, alternatively, following an axial movement of a component along a predetermined distance. U.S. Pat. No. 4,721,196, which issued to Layer, et al on Jan. 26, 1988 describes an overtravel stop for rotary shaft. The overtravel stop includes a fixed stop having at least a pair of stop jaws disposed at different radii from the axis of the rotary shaft. A follower member is provided about the rotary shaft and is adapted to rotate with the shaft within a selected travel limit. The follower member is associated with a stop member having at least a pair of stop jaws disposed at the same different radii as the stop jaws on the fixed stop. The follower member is rotationally shiftable with respect to the shaft when the shaft reaches its travel limit. The stop member is axially movable into engagement with the fixed stop when the follower member rotationally shifts relative to the shaft. At least some of the stop jaws have negative rake angles and a shock absorber is provided behind the fixed stop.

Other mechanisms are disclosed in patents such as Gillingham, et al U.S. Pat. No. 4,641,737 issued Feb. 10, 1987 and in French Patent 1,157,306 published May 28, 1958. In the prior art generally, an adjust feature for changing the final stop position is not easily obtainable, especially where there is a need to change the stop position on a continuously variable basis.

DISCLOSURE OF THE INVENTION

It is an object of the present invention to provide in a rotary travel limit stop mechanism a novel adjustable overtravel stop.

Yet another object is to provide a novel adjustable stop which has infinite resolution for the adjustment of the final stop position.

A yet further object of the invention is to provide a housing having a sector shaped opening with a stop plate movable within the opening which carries a fixed stop member. In a preferred embodiment, a threaded coupling is provided so that the stop plate can be adjusted to precisely locate the point of engagement between a movable stop member carried by a gear and the adjustable fixed stop member. The adjustable fixed stop member may be spring biased into a normal non-engaging position to allow bidirectional rotation of the movable stop pin during rotation of the gear carrying the stop pin at positions intermediate the stop limit for the controlled element which may for example be an aileron, rudder or other flap object. The mechanism is easily assembled, is capable of being added to or incorporated within a rotary shaft travel mechanism and is capable of adjustment by a tool such as a wrench or screwdriver.

These and other objects of the invention will become more fully apparent from the claims, and from the description as it proceeds in conjunction with the appended drawings.

BRIEF DESCRIPTION OF THE DRAWINGS

FIG. 7A is an end view of the adjustment screw shown in FIG. 7;

BEST MODE FOR CARRYING OUT THE INVENTION

Figure 1:
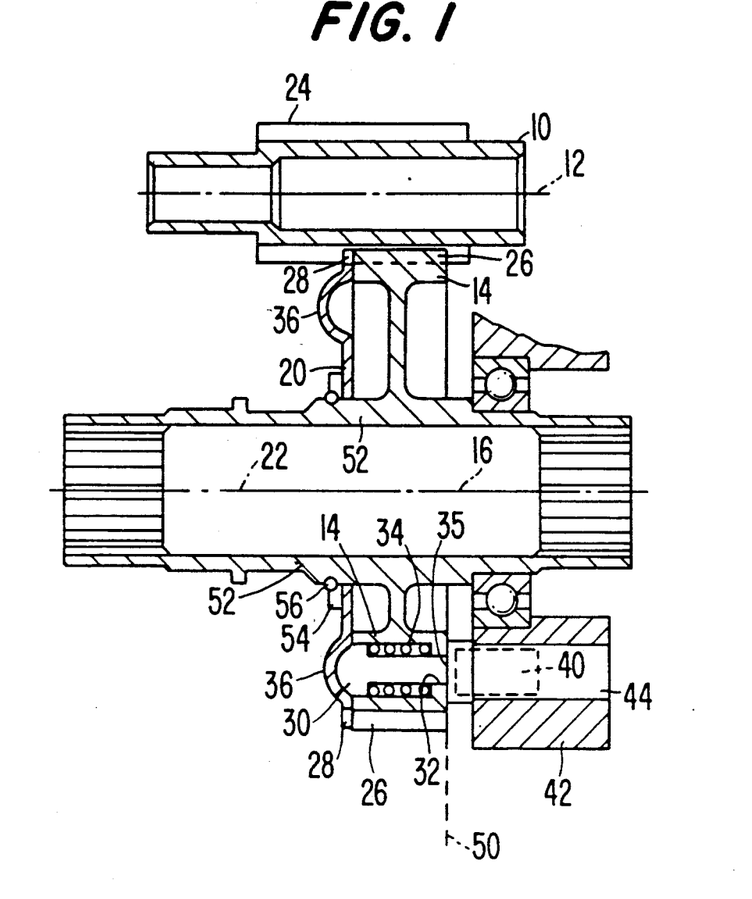
FIG. 1 is an elevation in section of a rotary travel limit stop mechanism incorporating the present invention.

Referring to FIG. 1, a first rotatable member 10 is arranged to rotate about a first axis of rotation 12. A second rotatable member 14 is arranged to rotate about a second axis of rotation 16 and a third rotatable member 20 is arranged to rotate about a third axis of rotation 22. As can be seen in FIG. 1, the second and third axes 16, 22 are coincident with each other.

A similar gear box is the subject of co-pending U.S. application Ser. No. 360,509, filed June 2, 1989, now U.S. Pat. No. 4,032,511 by John E. Ames and assigned to the assignee. The disclosure in that application is hereby incorporated by reference.

The first rotatable member 10 is provided with a plurality of gear teeth 24 which are associated in mesh relation with a plurality of gear teeth 26 on the second rotatable member 14. The third rotatable member 0 is provided with a plurality of gear teeth 28 which are in gear mesh relation with the gear teeth 24 of the first rotatable member 10. The number of gear teeth 26 is unequal to the number of gear teeth 28. Therefore, as the first member 10 rotates, the second and third members 14 and 20 rotate at different rotational speeds.

A movable stop member 30 is mounted to turn with the second rotatable member 14. The movable stop member 30 may be a pin mounted in a bore 32 in the second rotatable member 14 and biased to its illustrated position as by a spring 34 so that the free end 35 of the pin is retracted to be within the confines of the second rotatable member 14.

The third rotatable member 20 is provided with an annular groove 36 which extends partially around the side wall of member 20 and in circumferential alignment with the enlarged head of movable stop member 30. At a predetermined angular position extending over a sector width of, for example, about 15°, the groove 36 gradually slopes as best shown in FIG. 3 in region C and D to a raised portion at the region designated E and compresses spring 34. This causes the free end 35 of the pin to slide to the right as viewed in FIG. 1 and engage a fixed stop 40 that is shown in broken lines in FIG. 1. Fixed stop 40 is supported for an adjusting movement relative to frame 42 along a circumferential path 44 (see also FIG. 2) that is traversed by the free end 35 of pin 30 when pin 30 is in its extended position.

Figure 2:
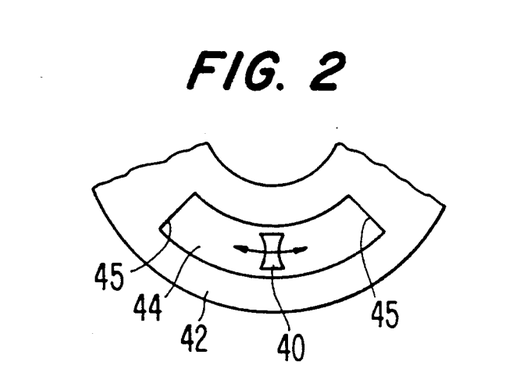
FIG. 2 is a fragmentary end view of the adjustable fixed stop employed fixed stop in FIG. 1.
Figure 3:
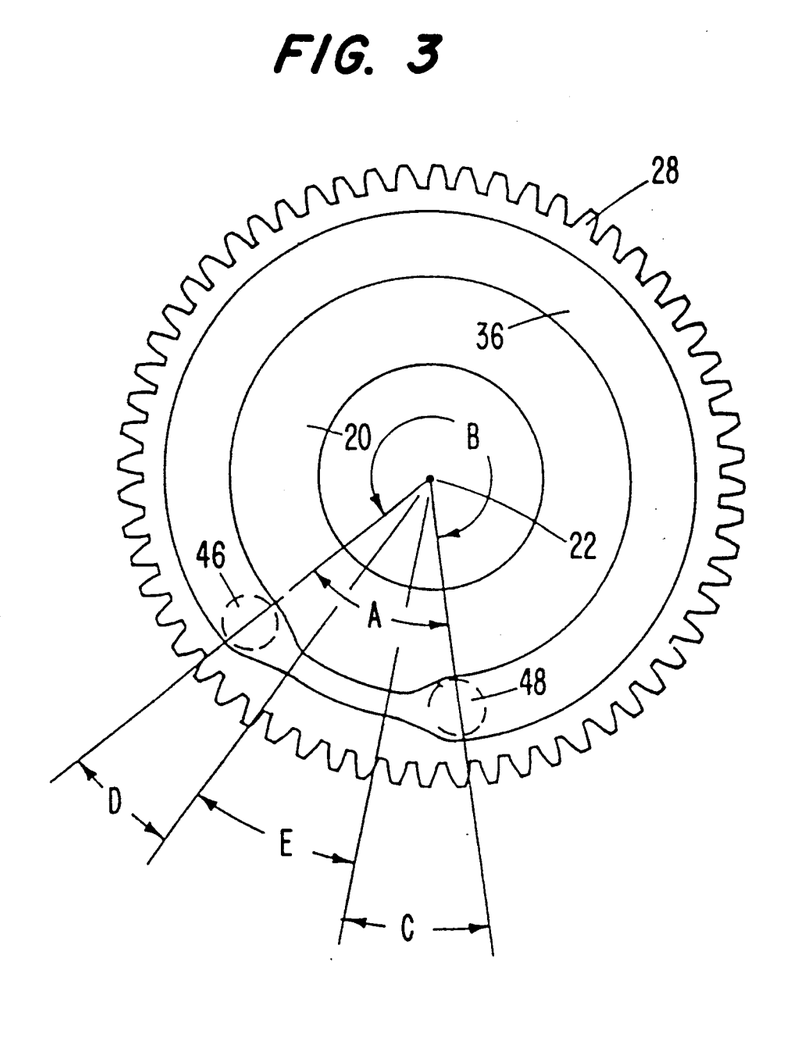
FIG. 3 is a view of a third gear member showing an annular cam that is used in the embodiment of FIG. 1.

The length of the circumferential path 44 is sufficiently long so that the stop position of the gear drive can be selected at any predetermined rotational position, corresponding to at least 5°, and, preferably, about 15° or more, in either direction from the central position as illustrated in FIGS. 1 and 2.

The rightmost end of the movable stop member 30 is positioned at a location, indicated by dashed line 50, which does not interfere with the fixed stop member 40 during normal operation as the second rotatable member 14 rotates about its axis of rotation 16. However, it should be apparent that a movement of the rotatable stop member 30 in a direction toward the right in FIG. 1 will cause the rightmost end of the rotatable stop member 30 to move to the right of the dash line 50 and into physical interference with the fixed stop member 40. In FIG. 1 the right end 35 of the movable stop member 30 and the left end of the fixed stop member 40 are shown as extending to the dashed line 50. However, it should be noted that a minimal amount of clearance is provided between the movable stop member 30 and the fixed stop member 40 during normal rotation of the second rotatable member 14.

The third rotatable member 20 in FIG. 1 is disposed around an output shaft 52 which supports the second rotatable member 14. The third rotatable member 20 is held in position by a retaining ring 54 and a snap ring 56. It should be understood that the third rotatable member 20, while being positioned on the shaft 52 of the second rotatable member 14, is free to rotate relative to the output shaft 52. It should further be understood that the second rotatable member 14 and the third rotatable member 20 are not rigidly attached together but, instead, are arranged in such a way that they can rotate relative to each other. Since both the second rotatable member 14 and third rotatable member 20 are arranged in gear mesh relation with the first rotatable member 10, and are provided with different numbers of gear teeth, a rotation of the first rotatable member 10 about its axis of rotation 12 will cause the second and third rotatable members 14, 20 to rotate at different relative speed about their respective axes of rotation.

With reference to FIG. 3, the third rotatable member 20 is shown with its annular groove 36 extending partially around its axis of rotation 22. As described above, the annular groove 36 extends at full depth around the axis of rotation 22 only around the portion of the third rotatable member 20 which is shown by angular distance B in FIG. 3. Angular distances C and D represent the ramp portions of the annular groove 36 where the depth of the annular groove tapers form full depth to almost no depth. This portion of virtually no depth continues along the angular distance designated by E in FIG. 3. Therefore, it should be understood that the annular groove 36 extends at full depth along the angular distance illustrated by B in FIG. 2 and at a depth less than full depth along the angular distance designated by A in FIG. 2. As illustrated by dashed circles 46 and 48 in FIG. 3, the rounded portion of the movable stop member 30 can slide in the full depth portion of the annular groove 36 between location 46 and location 48 along the path distance B without being caused to move axially away from the plane of the third rotatable member 20. However, when the rounded portion of the movable stp member 30 encounters region C or region D of the annular groove 36, the ramp portion of the annular groove will cause the movable stop member 30 to move axially relative to the third rotatable member and, as illustrated in FIG. 2, through the opening 32 in the second rotatable member 14 while compressing the spring 34 and moving into physically interfering association with the fixed stop member 40.

To further illustrate the operation of the gear mechanism thus far described, it will be assumed that the output shaft 52 is intended to rotate 24 revolutions within its operating range and, at the opposite ends of its travel, is to be stopped by the engagement of positive mechanical stop members. The set of gear teeth 26 on the second rotatable member 14 is provided with 65 teeth and is driven by its gear mesh engagement with the gear 24 of the first rotatable member 10 which is provided with 17 teeth. In addition, the third gear 28 of the third rotatable member 20 is provided with 63 teeth. The third rotatable member 20 is restrained from axial movement by the retaining ring 54 which is held in place by the snap ring 56. However, the third rotatable member 20 is permitted to move rotationally relative to the shaft 52 and the second rotatable member 14. As described above, the third rotatable member 20 is provided with the annular groove 36 which engages the head of the movable stop member 30 which, in turn, is caused to remain in contact with the annular groove by the force of the spring 34.

During the operation of the present invention within its operating range, the head of the movable stop member 30 slides within the deepest portion of the annular groove 36. During this normal operation, the opposite end of the movable stop member 30 is disposed in clearance relation with the fixed stop member 40. Beginning with the last revolution of the normal operating range, the spherical head of the movable stop member 30 is positioned at either position 46 or position 48, as shown in FIG. 3. During the last revolution of the normal operating range, the relative rotation of the second and third members causes the spherical head of the movable stop member 30 to ride up either ramp D or ramp C, depending on the direction of rotation of the device. Since these ramps will cause the movable stop member 30 to move into physically interfering relation with the fixed stop member 40, the movable and fixed stop members 30, 40 will move into engagement with each other during the next revolution of the second rotatable member 14.

A reversal of the rotatable members from this stop engagement position permits the movable stop member to move back down the ramp and, under the force of the spring 34, to retract sufficiently to clear the fixed stop member 40 during the next revolution and remain in this retracted position for the next 22 revolutions until, during the 24th revolution, it moves up the other ramp in the annular groove 36 to move into physically interfering relation with the fixed stop member 40.

In this example, for 24 revolutions of the second rotatable member, with its gear 26, the first rotatable member will rotate 91.765 revolutions as determined by multiplying the number of revolutions of the second rotatable member (e.g. 24) by the number of teeth in gear 26 of the second rotatable member 14 (e.g. 65 teeth) and then dividing that result by the number of teeth of gear 24 of the first rotatable member 10 (e.g. 17 teeth). The third rotatable member 20 will rotate 24.762 revolutions as determined by multiplying the number of revolutions of the first rotatable member 10 by the number of teeth in gear 24 of the first rotatable member 10 (e.g. 17 teeth) and dividing the result by the number of teeth in gear 28 of the third rotatable member 20 (e.g. 63 teeth). This means that the second rotatable member 14 and the third rotatable member 20 will move relative to each other by 0.762 turns which is determined by subtracting the 24.0 turns of the second rotatable member from the 24.762 turns of the third rotatable member. This relative rotation of 0.762 turns is equivalent to 274.32 degrees of rotation for every 24 turns of the second rotatable member.

Since the second rotatable member rotates 24 revolutions, the 274.32 degrees of relative rotation is equivalent to 11.43 degrees per turn. Therefore, the large distance indicated by reference numeral B in FIG. 3 is equivalent to 251.46 degrees which is determined by subtracting 2 times 11.43 degrees, or 22.86 degrees from the 274.32 degrees determined above. Therefore, the movable stop member 30 must be designed in association with the ramps, C and D, to move the movable stop member 30 from a noninterfering relation with the fixed stop member 40 to a physically interfering relation with the fixed stop member 40 within 11.43 degrees of travel on the two ramps of the annular groove 36.

In accord with a major feature of this invention, the fixed stop member 40 is mounted for infinitesimal adjustment by movement along a circumferential path indicated by slot 44 which has end surfaces 45 to fine tune the ultimate stop position.

Figure 4:
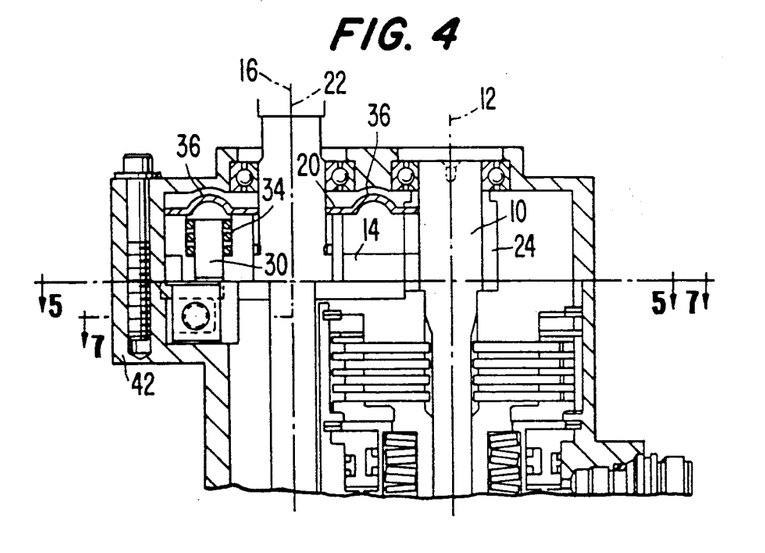
FIG. 4 is an elevation in section of an assembly including the rotary travel stop mechanism of the present invention.

With reference now to FIG. 4, a partial assembly of the stop mechanism described in connection with FIGS. 1-3 is illustrated with a first shaft 10 mounted for rotation about axis 12 and gear members 14 and 20 that are mounted for rotation about axis 16, 22 which, as in the FIG. 1 embodiment, are coincident. Gear teeth 24 on the first shaft 10 engage gear teeth on the second and third members 14 and 20. The numbers of gear teeth on the second member 14 and on the third member 20 are slightly different to cause a relative rotation of the second gear member 14 with respect to the third gear member 20. Movable stop pin 30 is biased by spring 34 into the annular groove 36 of third member 30. At limit positions of an airplane flap or comparable device, the pin 30 is urged downwardly as viewed in FIG. 4 to compress spring 34 so that the free end reaches the position shown in dotted lines.

Figure 5:
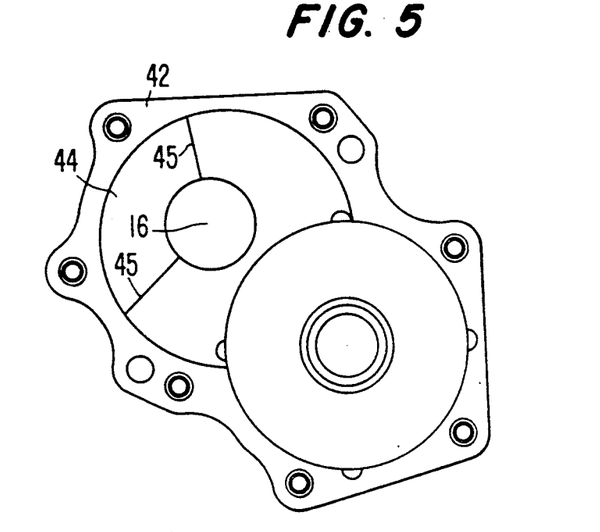
FIG. 5 is a top plan view taken along line 5—5 of FIG. 4 without the adjustable stop plate.

With reference also to FIG. 5, the frame 42 between the end surfaces 45 contains a sector shaped opening 44 about a center 16.

Figure 6:
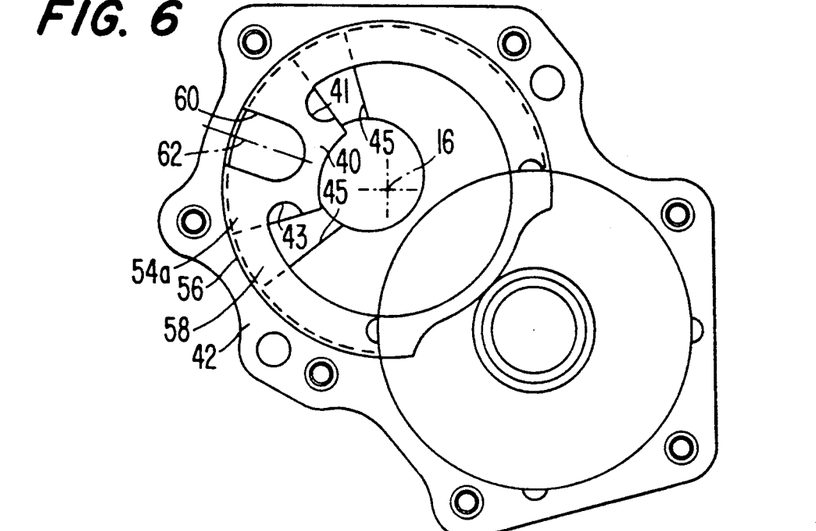
FIG. 6 is a view similar to FIG. 5 showing also the adjustable stop plate.
Figure 7:
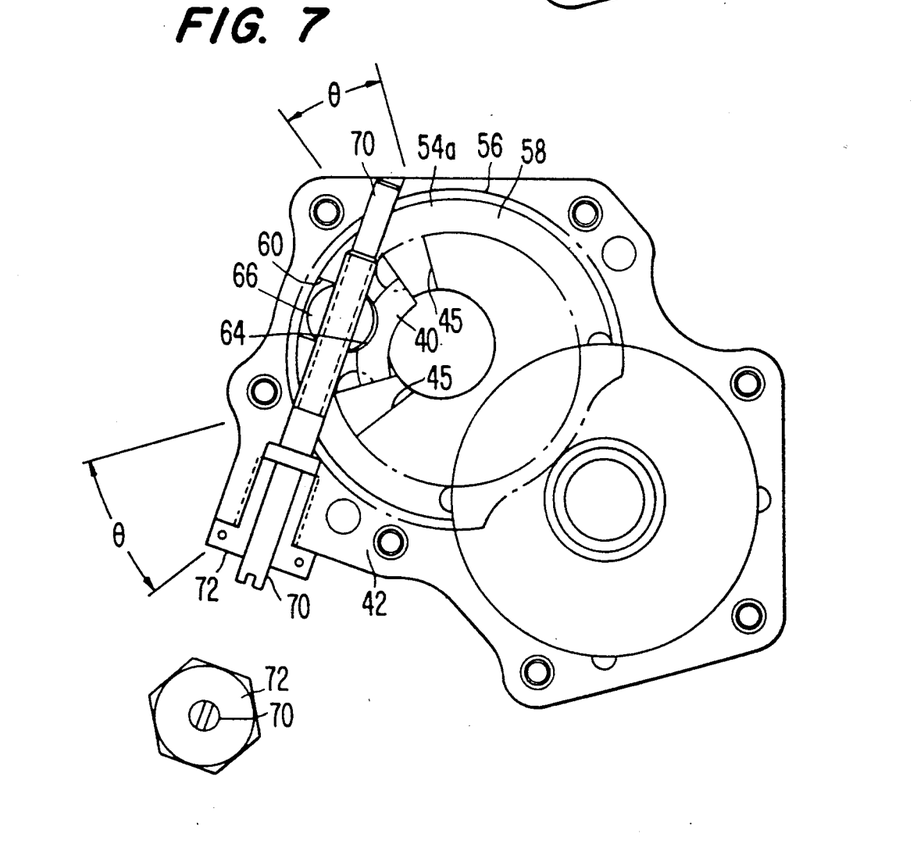
FIG. 7 is a view taken along line 7—7 showing the stop adjustment screw and barrel nut which mates with the stop plate of FIG. 6.

With reference to FIGS. 6 and 7, the fixed stop member 40 has a pair of semi-circular surfaces 41, 43 which engage the movable stop pin member 30 depending on the direction of rotation of the second gear member 14. Fixed stop member 40 is on an abutment stop plate 54a which is illustrated to have a cylindrical outer wall 56 that surrounds a central raised portion of the frame 42 and also a covering surface that provides suitable strength and rigidity for absorbing the energy that accompanies the stop action.

Adjustable stop plate 54a has a slot 60 which has an axis 62 that extends radially with respect to axis 16. A barrel nut 64 which has inner threads is formed with a protuberance 66 as illustrated in FIG. 7. The protuberance 66 fits into slot 60 so that the protuberance can slide relative to the parallel walls of slot 60 as the barrel nut moves in either direction along its longitudinal axis. The protrusion 66 thus causes the adjustable stop plate 54a to move circumferentially through an adjustment angle θ in either direction thereby displacing the movable stop member semi-cylindrical surfaces 41, 43 and providing infinitesimal adjustment.

A stop adjustment screw 70 is threadedly received in the threaded portion of barrel nut 64. The stop adjustment screw is suitably anchored to the frame as by a anti-rotation cap 72 and mating surfaces to maintain the stop adjustment screw 70 in a fixed axial position. As the stop adjustment screw 70 is rotated, the barrel nut moves the stop plate 54a clockwise or counterclockwise to change the position of the semicircular surfaces 41, 43 of the fixed stop member which engage the movable stop pin member 30. The total range of adjustment is clockwise and counterclockwise from the central position as illustrated in FIGS. 6 and 7.

Figure 8:
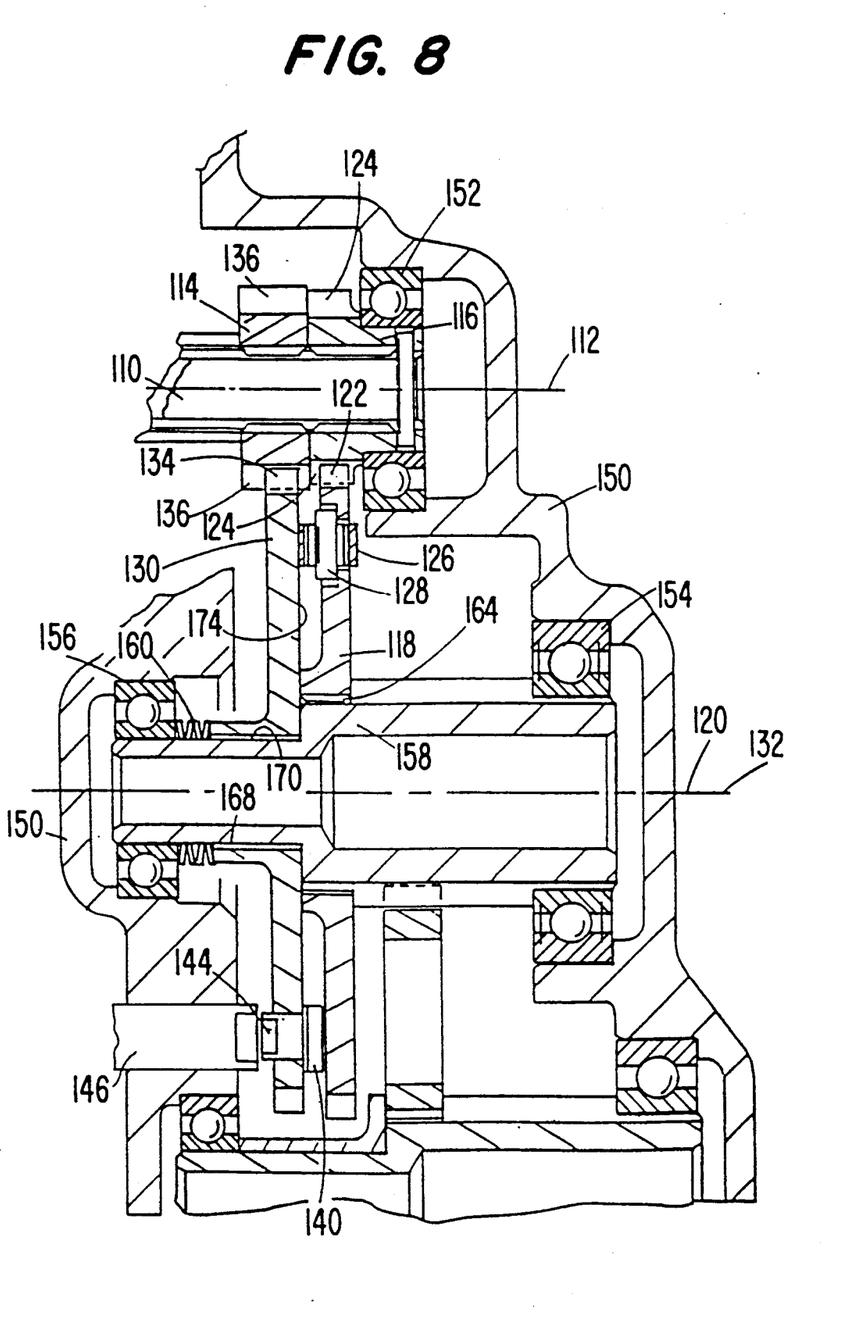
FIG. 8 an elevation in section of a different embodiment of rotary travel limit stop mechanism that has an adjustable fixed stop member in accordance with the present invention.
Figure 9:
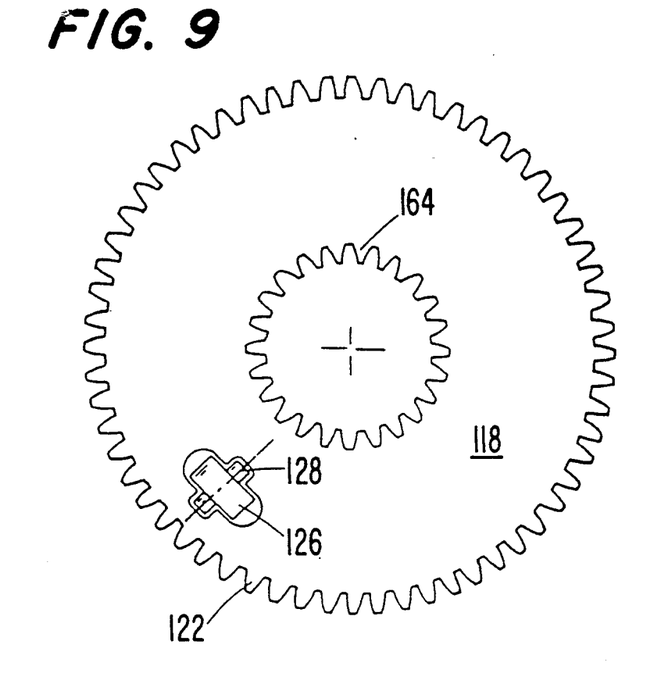
FIGS. 9 and 10 are views of the second and third control gear members respectively employed in the mechanism shown in FIG. 8.
Figure 10:
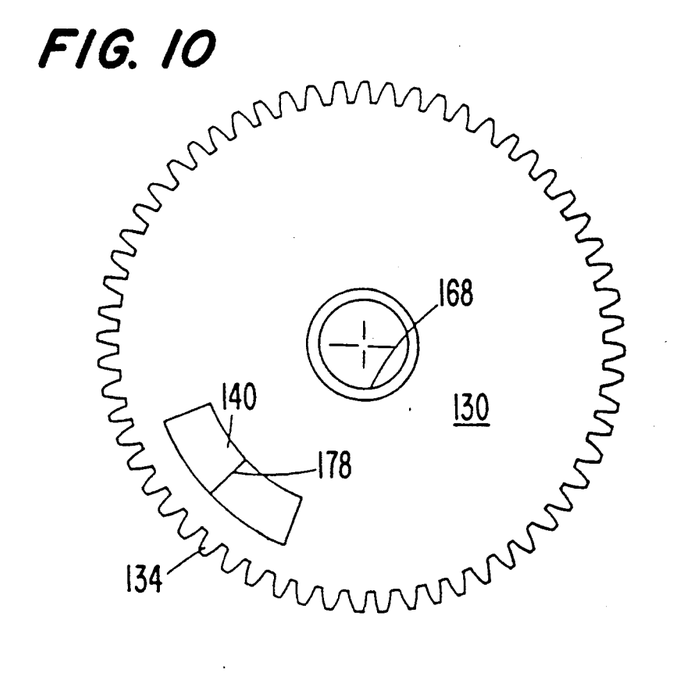

The adjustable fixed stop mechanism may be adapted to other rotary travel limit stop mechanisms. Reference is made to FIGS. 8-10 which illustrate a somewhat different mechanism which can also incorporate the present invention.

FIG. 8 illustrates a gearbox which comprises a first rotatable member 110 to be driven by an external power source (not shown in FIG. 8). The first rotatable member 110 is disposed to rotate about a first axis of rotation 112. It is also provided with a plurality of gear teeth. The gear teeth are contained in segments 114 and 116. A second rotatable member 118 has a second axis of rotation 120 and is associated in gear mesh relation with the first rotatable member 110. The teeth 122 of the second rotatable member 118 are associated in gear mesh relation with the teeth 124 of the second segment 116 of the first rotatable member 110. A cam follower 126 is rotatably connected to the second rotatable member 118. As shown in FIG. 8, the cam follower 126 can be a roller arranged to rotate about a central pin 128 which is attached to the second rotatable member 118.

A third rotatable member 130 has a third axis of rotation 132 and is provided with a plurality of gear teeth 134 which are associated in gear mesh relation with a plurality of gear teeth 136 in the first segment 114 of the first rotatable member 110. It should be understood that the second rotatable member 118 is provided with a different number of gear teeth 122 than the gear teeth 134 of the third rotatable member 134. The third rotatable member 130 is provided with a cam surface 140 or ramp, which will be described in greater detail below. Rotation of the first rotatable member 110 causes the second 118 and third 130 rotatable members to rotate at different speeds about their respective axes of rotation, 120 and 132 respectively. This different rate of rotation causes relative rotation to occur between the second rotatable member 118 and the third rotatable member 130. As this relative rotation continues, the cam follower 126 eventually moves into contact with the cam surface 140. When this contact occurs, an axial force is exerted between the second rotatable member 118 and the third rotatable member 130 which causes the third rotatable member 130 to move axially away from the second rotatable member 118.

A similar gear box is the subject of co-pending U.S. application Ser. No. 360,508 filed June 2, 1989, now U.S. Pat. No. 4,930,611. The disclosure in that application is hereby incorporated by reference.

In accordance with the present invention, the third rotatable member 130 is provided with a protuberance on movable stop member 144 which is attached to the third rotatable member 130. Another protuberance or fixed stop member 146, is rigidly attached to a stop plate structure such as the stop plate 54 illustrated in FIGS. 5, 6, and 7. In this embodiment of the present invention, the housing structure 150 is shaped to receive the first, second and third rotatable members in bearing support relation. For example, bearing 152 supports the first rotatable member 110 and bearings 154 and 156 support the second and third rotatable members. As can be seen in FIG. 8, a shaft 158 is provided to carry both the second rotatable member 118 and the third rotatable member 130.

FIG. 9 illustrates the second rotatable member 118 of this embodiment of the present invention. It comprises a plurality of gear teeth 122 which are associated in mesh relation with the gear teeth 124 of the first rotatable member 110 when the second rotatable member 118 of FIG. 9 is assembled in a gear box as illustrated in FIG. 8. The inner diameter of the second rotatable member 118 is provided with a plurality of spline teeth 164 which are associated with spline teeth on the shaft 158 when the second rotatable member 118 is assembled in the gearbox as illustrated in FIG. 8. The spline teeth 164 permit the second rotatable member 118 to rotate in synchronization with the shaft 158. The cam follower 126, or roller, is rotatably connected to the second rotatable member 118 by the pin 128. As described above, the cam follower 126 is positioned to roll along the surface of the third rotatable member 130 and, eventually, onto the ramp 140 of the third rotatable member 130.

FIG. 10 illustrates the third rotatable member of this embodiment. The inner diameter 168 of the third rotatable member 130 is shaped to receive a portion 170 of the shaft 158 in sliding relation therein. When assembled onto the shaft 158, as illustrated in FIG. 8, the third rotatable member 130 is permitted to rotate relative to the shaft 158 and to translate axially relative to shaft 158. Its rotational and axial position is determined by the mesh relation between the gear teeth 134 and the gear teeth 136, as shown in FIG. 8, and the spring 160 which forces the third rotatable member 30 towards the right in FIG. 8.

As illustrated in FIG. 10, the third rotatable member 130 is provided with a cam surface 140, or ramp, which is disposed at generally the same radius relative to the axes of rotation 120 and 132 as the cam follower 128 of the second rotatable member 118. As the second and third rotatable members revolve about their axes of rotation 120 and 132 at different rates of speed, the cam follower 126 eventually moves into contact with the cam surface 140. When this occurs, an axial force is exerted against the third rotatable member which causes the second and third rotatable members to move apart from each other. Since the axial movement of the second rotatable member 118 is restrained, this relative axial movement causes the third rotatable member 130 to move toward the left in FIG. 8 against the resistance of the spring 160. As described above in relation to FIG. 8, this relative movement causes the movable stop member 144 to move into interfering relation with the first stop member 146.

Engagement between the two stop members 144 and 146 does not occur during normal rotation of the third rotatable gear driven member 130 because of the bias of compression spring 160. However, after a predetermined number of rotations of the shafts in the gear assembly in a first direction, the roller 126 on the second rotatable gear driven member 118 will engage the cam surface 140 and cause the third rotatable member 130 to slide axially against the compression force of spring 160 so that engagement occurs between the stop members 144 and 146.

In accord with a major feature of this invention, the fixed stop member 146 is mounted for infinitesimal adjustment by movement along a circumferential path in a manner analogous to that described in connection with the embodiment of FIG. 1 and illustrated in FIGS. 2-7.

While several embodiments of this invention have been described, it is apparent that other changes may be made without departing from the spirit of this invention. All changes and equivalents which fall within the scope of the appended claims are intended to be covered thereby.

I claim:

1. A rotary travel limit stop apparatus comprising:
    a first member rotatable about a first axis;
    a second member rotatable about a second axis;
    a third member rotatable about a third axis;
    said second and third members being axially adjacent each other and being driven by said first member at different rotational speeds with one of said second and third members carrying a movable stop member along a circumferential path about said one member axis;
    a fixed stop member which is supported for movement on a frame along a circumferential path about said one member axis to any one of an infinite number of positions within said path; and
    means associated with the other of said second and third members for physically abutting said one member at a preselected relative position between said second and third members to cause said movable stop member to translate axially in the direction of said one member axis and engage said fixed stop member.

2. The apparatus as defined in claim 1 wherein said fixed stop member has two surfaces, one of said surfaces engaging said movable stop member to provide a limit stop position when said first member revolves in one direction and the other of said surfaces engaging said movable stop member to provide a stop limit position when said first member revolves in an opposite direction.

3. The apparatus as defined in claim 1 wherein the axes for the second member and the third member are substantially coaxial and the second and third members have different numbers of teeth which engage on the first member gear portions having the same number of teeth.

4. The apparatus as defined in claim 1 wherein:
    the frame has a sector shaped opening having two walls that are substantially radially disposed relative to said one member axis;
    an insert is mounted in said sector shaped opening for bidirectional movement along said circumferential path; and said fixed stop member is mounted on one side of said insert.

5. The apparatus as defined in claim 4 wherein:

the insert has a slot with a radial axis, said slot being accessible from a second side thereof;

a nut having a protuberance extends into said slot from said second side; and a threaded member is rotatably received in said nut and anchored against axial movement, a rotational axis of said threaded member being generally perpendicular to the slot axis whereby rotation of the threaded member causes axial movement of said nut and circumferential movement of said insert in said sector shaped opening.

6. The apparatus as defined in claim 5 wherein the frame has a cylindrical wall portion centered about said one member axis and said insert has a skirt which extends over said cylindrical wall portion to guide said insert during adjustment of said fixed stop member by rotation of said threaded member.

7. The apparatus as defined in claim 6 wherein the nut having a protuberance is a barrel nut.

8. The apparatus as defined in claim 1 wherein:

the movable stop member comprises a pin mounted for movement in an axial direction in a through aperture in said one member;

spring means for biasing said pin to a position which does not engage said fixed stop member; and means on said other member for engaging said pin to move the pin axially against the bias of said spring means and into position for abutment with said fixed stop member.

9. The apparatus as defined in claim 1 wherein:

said one member which has the movable stop member is mounted for axial movement relative to the other member; and a roller and ramp surface is provided on respective ones of said one member and said other member for axially displacing said one member having the movable stop member so that the movable stop member is displaced into position for abutment with said fixed stop member.

10. A rotary travel limit stop apparatus comprising:

a frame supporting first, second and third members each of which is rotatable about a corresponding one of three parallel axes;

said second and third members being axially adjacent and driven by said first member at different rotational speeds with one of said second and third members carrying a movable stop member in a circumferential path about said one member axis;

said frame supporting a fixed stop member adjacent a side face of said one member at a position adapted to engage said movable stop member on an intermittent basis determined by an axial position of said movable stop member;;

adjustment means for varying the position of said fixed stop member relative to said frame whereby the location of said fixed stop member is adjustable to any one of numerous positions along a predetermined arc length of said circumferential path between said member side face and the frame; and means associated with said second and third members at a preselected relative position of said second and third members with respect to each other to cause said movable stop member to move axially in the direction of said one member axis from a position which does not engage said fixed stop member to a position of engagement whereby engagement with said fixed stop member provides a rotational limit position for said first member.

11. The apparatus as defined in claim 10 wherein:

the frame has a sector shaped opening having two walls that are substantially radially disposed relative to said one member axis;

an insert is mounted in said sector shaped opening for bidirectional movement in a circumferential direction along said predetermined arc length; and said fixed stop member is mounted on one side of said insert.

12. The apparatus as defined in claim 11 wherein:

the insert has a slot with a radial axis on a second side, said slot having an axis that is radially disposed relative to the rotational axis of said one member;

a nut having a protuberance extends into said slot from said second side; and a threaded member is rotatably received in said nut and anchored against axial movement so that rotation of the threaded member causes axial movement of said nut along said threaded member and the protuberance extending into said slot causes circumferential movement of said insert in said sector shaped opening thereby to adjust the position of the fixed stop member.

13. The apparatus as defined in claim 12 wherein:

the frame has a cylindrical wall portion centered about said one member axis; and said insert has a skirt and upper surface which extends over a substantial portion of said cylindrical wall portion to guide said insert during adjustment of said fixed stop member by rotation of the threaded member and mechanical support for said fixed stop member.

14. The apparatus as defined in claim 13 wherein the nut having a protuberance is a barrel nut and a rotational axis of the threaded member is generally perpendicular to the axis of said slot.

* * * * *